May 16, 1939.  E. A. SLAGLE  2,158,595
METHOD FOR THE DISPOSAL OF SEWAGE
Filed June 5, 1937
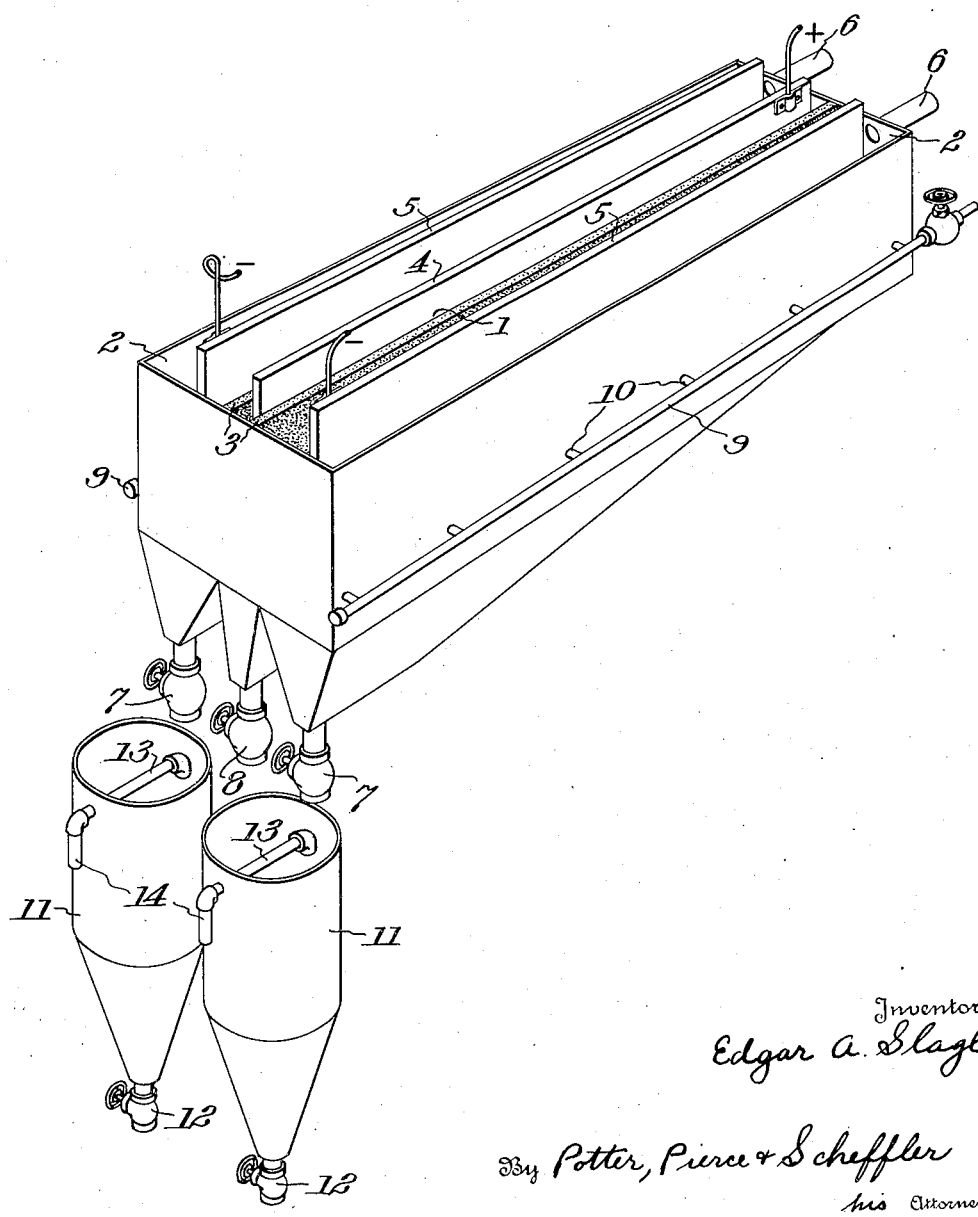
Inventor:
Edgar A. Slagle
By Potter, Pierce & Scheffler
his Attorneys.

Patented May 16, 1939

2,158,595

UNITED STATES PATENT OFFICE 2,158,595

METHOD FOR THE DISPOSAL OF SEWAGE

Edgar A. Slagle, North Plainfield, N. J., assignor to Research Corporation, New York, N. Y., a corporation of New York Application June 5, 1937, Serial No. 146,688

10 Claims. (Cl. 204—25)

This invention relates to the treatment of sewage and sewage sludge, including trade wastes, for the separation of the solid and liquid constituents thereof, and in particular to a method for promoting the flocculation and dewatering of the sewage solids involving electrodialysis and/or electroomosis.

Sewage and sludge are defined by the American Society of Civil Engineers (see Proceedings of the New Jersey Sewage Works Association, March, 1936), as follows:

*Sewage.*—"A combination of (a) the liquid wastes conducted away from residences, business buildings, and institutions, and (b) from industrial establishments, with (c) such ground, surface, and storm water as may be admitted to or find its way into the sewers."

*Sludge.*—"The accumulated suspended solids of sewage deposited in tanks or basins, mixed with more or less water to form a semi-liquid mass."

These definitions may be supplemented by information from other sources leading to the conclusion that the dividing line between sewage and sewage sludge may be taken as being at about 0.3 percent of total solids. Material containing less than 0.3 percent total solids and usually less than 0.1% is to be regarded as being sewage, whereas material containing more than 0.3% and usually more than 1% of total solids is to be regarded as sewage sludge, excepting when the characteristics of the material readily and clearly indicate a different classification.

Sewage has been and is being treated by various methods and by the use of various apparatus none of which is or has been entirely satisfactory. For the separation of solids, settling by gravity, centrifugation, filtration and combinations of these operations have been employed, such operations generally being associated with a conditioning of the sewage, for instance, by the addition of flocculating agents, electrolysis, aeration and/or bacterial action for improving the physical condition of the solids with respect to separation thereof. Some of the shortcomings of these methods of treatment are their slowness, the high cost of the relatively large amounts of flocculating agents required, and the bulk of the resulting solids to be disposed of, the high water content of the separated solids, which prevents their being economically dewatered and burned, and unreliability especially of methods involving bacterial action. The failure of the bacterial method to function properly frequently results in pollution of the atmosphere by objectionable odors and pollution of streams due to the discharge thereinto of incompletely purified effluent.

In accordance with the present invention the raw sewage, or sewage sludge, or both, is subjected to an electrical treatment which will be referred to hereinafter as electrodialysis, against another liquid through a diaphragm.

As is well known, electrodialysis can be utilized to transfer substances from one body of liquid through a diaphragm to another body of liquid and advantage can be taken of that property of the diaphragm which prevents diffusion of the transferred substances back into the liquid from whence they came to stabilize the results of the electrodialysis. Electrodialysis has been used previously for purifying or altering fluids and suspensions in fluids, but the present invention is aimed primarily at the treatment of sewage, sewage sludge, and sewage solids, as defined in a broad sense, bringing about those changes that make for efficient and satisfactory disposal thereof. The results obtained through the present invention include improved sedimentation or removal otherwise of the suspended solids in sewage, reduction in oxygen demand and in sulphide content of the sewage effluent, concentration and good dewatering of the sludge removed from sewage, reduction in the amount of sludge solids to be disposed of, and reduction in the putridity of the solids. Some of the results just mentioned are obtained directly by the electrical treatment. Some are obtained by other means, but in more efficient or thorough manner because augmented by the electrical treatment; for instance, the electrical treatment makes it possible to obtain a given reduction in turbidity of the sewage with much less coagulant or flocculating agent (e. g. ferric chloride, FeCl₃) than is possible without the electrical treatment. The application of the treatment to sewage sludge offers another example of the modifying effects of the electrical treatment. The treatment alters the sludge so that it can be concentrated, or dewatered, on a filter to a much greater degree than results from conventional methods alone.

A specific procedure in accordance with my invention will be described hereinafter with reference to the accompanying drawing which illustrates diagrammatically one embodiment of apparatus suitable for execution of the process.

The essentials of the apparatus for the treatment of the sewage and sewage sludge are an electrolytic cell provided with a diaphragm dividing the cell into anode and cathode chambers, suitable anode and cathode connected to a source of direct current, means for agitating, means for supplying treating materials, and settling tanks or other suitable means for separating the solid from the liquid constituents. In such an apparatus raw sewage or the partially separated solid content of sewage may be subjected to electrodialysis against another suitable liquid. This treatment applied to raw sewage makes it more amenable to subsequent treatment with chemical flocculating agents and gravity settling, whereas when the treatment is applied to the partially separated solids or sewage sludge, the result is a mixture which can be readily dewatered to a high degree on a filter. I prefer to carry out both of these treatments simultaneously in the same electrolytic cell, so that while the raw sewage is being fluocculated and prepared for sedimentation, sludge, such as that produced by sedimentation of the treated sewage, is being made amenable to dewatering in the other compartment of the cell and each liquid serves as the liquid against which the other is subjected to electrodialysis. It will be understood, of course, that the invention is not limited to this precise procedure, excepting as may be required by the terms of the appended claims, and that flocculation of raw sewage without simultaneous treatment for dewatering of sewage sludge and treatment of sewage sludge from any source without simultaneous flocculation of raw sewage is within the scope of my invention.

Referring to the accompanying drawing, the electrolytic cell is divided into three compartments,—two cathode compartments 2, 2, and the anode compartment 1 by the diaphragms 3, 3. The cell is made of any suitable material, such as wood, concrete, or mastic-covered ceramic ware, and the diaphragms may be made of foraminous ceramic tile, asbestos cloth or other woven material, porous rubber, collodion, parchment or other suitable diaphragm material. Compartment 1 contains the anode 4 preferably made of graphite, structural carbon, or other suitable inert and relatively insoluble conductive material, and compartments 2 contain the cathodes 5, 5, which may be made of any suitable material, such as graphite, carbon, lead, copper, iron or other conductors. Iron anodes will dissolve, yielding with properly controlled conditions, a flocculating agent, but the invention can be described in its simplest form with reference to the use of insoluble anodes and with metal cathodes, e. g. of iron, reliance being had on added chemical flocculating agents for fulfillment of the process. The three compartments are provided with sloping bottoms and with valved outlets 7, 7, and 8 at their lower ends. Cathode compartments 2, 2, are provided wtih sewage inlet pipes 6, 6. Means for delivering sewage sludge into compartment 1, such as a conveyor, is not shown. The valved pipes 9, 9, with connections 10, 10, entering the compartments 2, 2, serve to convey air into the compartments for the purpose of agitating and aerating the sewage. Compartments 2, 2, discharge into settling tanks 11, 11, provided with drain cocks 12, 12, and adjustable skimming pipes 13, 13, for removing the effluents after settling. Compartment 1 may discharge into a vacuum filter or the like, or into a storage receptacle for supplying the filter (not shown).

In treating sewage in accordance with the preferred embodiment of my invention, raw sewage is flowed into compartments 2, 2, through inlets 6, 6, until they are nearly full, and compartment 1 is filled with settled sludge solids drawn from the settling tanks 11. An E. M. F. from a direct current source is impressed across the electrodes and the voltage is adjusted to secure the desired current flow which has been found to be usually less than four amperes per square foot of total effective anode surface, for example, good conditioning of the sewage and dewatering of the sludge being obtained with a current density of 1.9 amperes per square foot (20.5 amps. per meter$^2$). In general the time of treatment varies inversely as the current flow and the current varies directly with the voltage impressed across the electrodes. The treatment can be hastened by raising the voltage, but there will be a loss in efficiency if the voltage is raised to values which promote electrolysis with evident generation of gas. With a diaphragm (tightly woven asbestos cloth has been found satisfactory) which does not set up a large voltage drop and with electrodes spaced preferably less than three inches from the diaphragm, a voltage of not over 15 volts will force sufficient current across the cell to give satisfactory and efficient results.

During the passage of the electric current the contents of compartments 2, 2, are agitated preferably by the introduction of air in finely divided form, introduced through a porous mass or plate. When the sewage in compartments 2, 2, has acquired a suitable pH value, valves 7, 7, are opened and the sewage is discharged into settling tanks 11, 11, where the solids and the supernatant liquid are separated in the customary manner. Such chemical or other conditioning material as may be found expedient to bring about the desired flocculation and settling of the suspended solids in the sewage may be added either before, during, or after the electric treatment. Applying chemical treatment after the electric treatment has produced good results. Various means for measuring adding, and mixing ferric chloride or other agent are available to those familiar with the art. The contents of compartment 1 are discharged to a settling tank or to a filter (not shown). The wet solids withdrawn from the tanks 11, 11, are charged into compartment 1 in a repetition of the process described. The treatment just described usually leaves the sewage effluent ready to be discarded into available water courses, but it can be given additional treatment if such treatment is indicated. The electric treatment and aeration tend to remove or alter the sulfur-bearing and other compounds present which are responsible for odorous conditions and reduce the oxygen consumption appreciably. The electric treatment with the addition of such flocculating agent as may be called for reduces the suspended solids to a low and acceptable value.

The changes made in the sludge are even more marked. The color of the solids changes from brown-black to gray. They are not putrescent and can be handled without giving offense to workmen or nearby residents. The water content of the sludge may be quickly reduced to 65–55 percent on a filter of the Oliver type leaving a friable cake which is easily removed from the filter and moved in trucks or heat treated in furnaces. The weight of solids to be disposed of is found to be from 20 to 30 percent less than is indicated by the analysis of the screened raw sewage. Apparently some of the solids, the sodium and potassium, for instance, have combined into soluble compounds or colloidal form and have passed out with the effluent. Liberation of constituents in gaseous form must also be considered as a source of sludge reduction.

The treatment described above must be adjusted to the kind of sewage being treated. The composition of sewage varies, of course, with its source. For instance, it may contain varying amounts of a variety of industrial wastes. Or it may be classed as strong, medium or weak, depending upon its solids content and oxygen demand, or as being fresh or stale. In general, strong sewage and stale sewage require a more extensive treatment than fresh or weak sewage. Both the sewage and the liquid against which it is subjected to electrodialysis must be capable of conducting electricity, i. e. they must contain electrolytes and, if necessary, electrolytes such as suitable acids, bases or salts are added. As will be apparent there are so many variables involved that it is practically impossible to define the limiting conditions for the treatment of all kinds of sewage.

Suitable values of current density and voltage drop from electrode to electrode have been given above. The time required to electrodialyze the sludge, which is usually given the longest treatment, is from two to six hours depending upon the nature of the sludge, the spacing of the electrodes, and other factors. The power required for such treatment is seldom over 400 kw. hours, and may be under 200 kw. hours per 1,000,000 gallons of sewage, although some treatments with refractory mixtures or in order to greatly reduce the chemicals required have taken as high as 1400 kw. hours.

The most critical factor in the treatment has been the pH value of both the sewage and the sludge. Sewages not greatly altered by industrial wastes arrive at disposal plants at about pH 7.0. In accordance with the present invention this is increased by treatment in the negative or cathode compartment of an electrodialysis cell to about 8.0. It has been found that in the treatment of typical examples of a variety of sewages having pH values within the range from 6 to 8 an increase in pH of from 0.7 unit to 1.6 units brings about a change in the physical and chemical make-up of the sewage which causes it to respond readily to treatments with small amounts of chemical flocculating agent. The savings in the cost of chemicals pay for the power required to increase the pH values to such extent. It is true that the pH value of sewage can be altered by addition of lime and less flocculating agent will be required as a result, but the procedure here is different. The lime is corrective in that it adds basic constituents to the sewage, but much inert material is thereby added to the normal sewage solids while no material is removed. Electrodialysis, on the other hand, removes acid radicals from the sewage and transfers them to the anode compartment while bringing alkaline constituents in very active form (e. g. sodium, Na, which is liberated as NaOH) into the cathode compartment thus adding to the alkalinity of the sewage. To appreciably reduce the amount of flocculating agent required by the addition of lime to sewage, considerable amounts of lime are required and this added material must be disposed of as sewage solids, a condition that greatly handicaps processes which call for the disposal of the solids by burning or other heat treatment.

It has been found that typical sludges dewater most readily after they have been treated in the anode compartment, as described above, to about pH 3.4. This has been found to be a critical value for typical examples of a variety of sludges when the sludge is subjected to simple electrodialysis with an insoluble anode. In fact, the percentage of water removed by the filter press falls off noticeably if the acidity of the sludge has been left above about pH 3.9 or reduced below about pH 3.0. Generally the pH value of the sludge should fall within the range from 3.2 to 3.6.

While I do not wish to be limited to any theory it appears that the electric field removes electric charges which peptize particles, dissociates agglomerates made up of loosely bound components, and upsets the acid-basic balance of the suspension. These changes make flocculating agents—especially in the sewage—react more quickly and efficiently in setting up conditions favorable to agglomeration and sedimentation and permit compacting of the material and release of "held" water, as is noticed especially in the sludge. A very definite transfer of materials through the diaphragm has been noticed. The several sulphur bearing ions, for instance $SO_4$, also chlorine, oxygen, and probably some of the hydroxyl ions, OH', pass from cathode to anode compartments making conditions in the latter space definitely acid and being responsible, probably, for the bleaching and deodorizing of the sludge. The hydrogen, ammonia, sodium, potassium, magnesium, calcium and other metal ions move from anode to cathode compartments. The transfer is not complete because sufficient current is not consumed to dissociate any appreciable amount of chemically bound material. However, ions in solution are moved as indicated and this removal, especially the removal of sodium from the sludge, probably has much to do with the dewatering phenomena. The loss of sludge solids realized in using the present process has not been fully accounted for. A careful analysis of the sewage effluent, the sludge filtrate, and the gases evolved would probably show that the material unaccounted for leaves the system as innocuous compounds through these avenues. The very decided reduction in ash in the sludge solids over the incombustibles present in sludge removed by conventional processes indicates that some of the loss, at least, is due to the liberation of metal bearing compounds, in soluble form, adjacent the cathode to be carried away by the sewage effluent.

For economical reasons I prefer not to effect complete flocculation of the sewage by electrodialysis alone, but to supplement a conditioning treatment by means of electrodialysis by the action of flocculating agents, such as iron or aluminum salts, as suggested above. Thus the electrical energy requirements are greatly reduced and the quantity of chemical flocculating agent is much less than would be required if the electrodialysis treatment were omitted, the complete flocculation being divided between the chemical and electrical treatment. The proportions of the flocculating action effected by the chemical and electrical means may be varied according to the circumstances, i. e. the cost of electrical energy as compared with the cost of chemical flocculating agents at the location of the sewage treatment, the desired bulk of the residue, etc.

I have observed that my method of treatment is particularly effective in the treatment of sewage associated with hard water and in the treatment of trade wastes, such as those from tanneries, slaughter and packing houses and sulfur black dye wastes, the treatment of which by the customary methods frequently is quite difficult and sometimes ineffective.

In carrying out my process I, of course, take advantage of known expedients, such as the continuous supply and continuous withdrawal of sewage and sewage sludge to and from the compartments of the cell and the continuous operation of the settling tank 11, 11. These details of operation do not constitute a part of my invention and therefore are not described in detail.

The invention will be illustrated by describing its application to the treatment of sewage from a municipality which must dispose of some industrial wastes as well as the usual domestic wastes and by citing the results obtained from such treatment. This particular sewage varies in the amount and character of the solids carried, both in suspension and in solution, depending upon the day of the week and the hour of the day, as will be understood by those familiar with the problems of sewage disposal. This is due to large extent to the habits of the housekeepers. Commercial laundries irregularly dump vats of waste waters carrying much finely divided suspended matter; occasionally dyeing establishments run spent dye materials (which do not, usually, respond to conventional treatments) into the sewer; and oily materials from automobile service stations and industrial plants are added from time to time and add to the difficulties of obtaining satisfactory sedimentation of suspended matter. In the following description, no attempt will be made to follow these variations in the sewage, which sometimes call for changes in treating conditions and give variations in the results obtained.

The sewage in question comes from a municipality where the water supplied through the mains comes from wells and a small river of irregular flow and is of medium "hardness". It is treated with chlorine in the manner and to the extent that is common where it is thought desirable to provide a margin of hygienic safety to an already potable water. There is considerable infiltration into the sewage of water and earth, during and immediately after rains, which alters the characteristics of the sewage and the burden on the treating plant. The suspended matter averages 260 parts per million, by weight, or 2170 pounds per million gallons of sewage, and the sewage is from four to seven hours old when it reaches the treating plant several miles from the municipality. It is not only macerated, but frequently high in sulphides. This sewage will be recognized as one requiring more treatment than is required by the average municipal sewage in the United States.

Upon reaching the treating plant the sewage is passed through screens which remove the coarse material. It is then divided into small streams which pass, in parallel, through the electrodialysis apparatus. This apparatus is made up of alternate cathode and anode compartments separated by more or less permeable diaphragms. The construction of a single cell for electrodialysis is illustrated in the drawing and comprises a single anode compartment of rectangular shape with a cathode compartment on either side. The cell has been built of wood, but electrically nonconducting ceramic or other materials can be used. The diaphragms are of close woven asbestos cloth, the cathodes or negative electrodes are of perforated sheet iron, and the anode is of comminuted carbonaceous material pressed into a coherent mass comprising what is commonly called an "insoluble" electrode. The anode compartment is approximately four inches wide, thirty inches deep, and twelve feet long, and the anode, about one inch thick, is hung vertically along the center of the compartment and held in insulated relationship to the sides and bottom. The cathode compartments are of corresponding depth and length, but somewhat greater in width than the anode compartment. The cathode in each compartment, respectively, is hung parallel to, and usually less than two inches from, the diaphragm and is insulated from the sides and bottom of the compartment.

As it has been found desirable to treat the sewage in the cathode compartments against sludge placed in the anode compartment, the streams of sewage are run through the cathode compartments. When these are first filled, sewage sludge is added simultaneously to the anode compartment in order that the pressure on the diaphragms be held approximately equal on both sides. When the cell is full the cathode compartment inlets and outlets are so controlled that sewage passes through at the desired rate. The sludge in the anode compartment is treated in batches and a batch is removed when it has been treated sufficiently to acquire the desired characteristics. It will be appreciated here that it is aimed to have the sewage receive suitable treatment in the same time that is required to impart to the amount of sludge which will settle from the sewage the desired anodic treatment. While a million gallons of the sewage specified flow through the cathode compartments of the electrodialysis cells described, about one percent of this volume of sludge is treated in batches in the anode compartments of these cells. The two cathode compartments with a total effective width of about three feet permits the sewage to be treated for about one-half hour (although the length of the treatment may be varied to meet different conditions) while the sludge from an equivalent amount of sewage receives a treatment in the anode compartment, with an effective width of about three inches, of about four hours. Some chemically treated or very fresh sludges may require less treatment.

The results of the above treatment included a rise in the alkalinity of the sewage from pH 7.0 (as received to pH 8.1, an increase in the acidity of the sludge from pH 7.9 (as put in the anode compartments) to pH 3.4, which has been found the optimum acidity for effective dewatering. The sewage has been treated with approximately 10 p. p. m. of iron as $FeCl_3$ (instead of a usual 30 p. p. m.) as it entered the cathode compartments. This chemical treatment plus the electrical treatment provided ready gravity sedimentation of the solids in a settling tank following the electrodialysis apparatus and the suspended solids were reduced from 260 p. p. m. to 20 p. p. m. The oxygen consumption of the sewage was reduced from 48 p. p. m. to 37 p. p. m. The amounts of solids eliminated by reduction to soluble, or gaseous, or other state not known, was 25 percent. The remaining solids taken from the anode compartments were dewatered on a filter of the Oliver vacuum type to a water content of 60 percent and gave a friable cake on the filter. The solids were of grayish color and lacking in the usual putrescent odor. That a profound change in the solids is effected by the electrical treatment is evidenced by the fact that on addition of lime no odor of ammonia is given off, whereas the addition of lime to untreated sewage solids yields a strong odor of ammonia. The oxygen consumption by the solids is decreased by the electrical treatment from 10,000 parts per million to 5,000 parts per million. The filtrate from the sludge was clear.

The electrical conditions held during the treatment required an expenditure of about 550 kilowatt hours per million gallons of sewage. The current was held at about two amperes per square foot of active electrode surface and this required a voltage drop of approximately 15 volts from anode to cathode.

This application is a continuation-in-part of my application Serial No. 8,911, filed March 1, 1935.

I claim:

1. Method of treating sewage, having a pH value of about 7, which comprises subjecting the sewage to electrodialysis in the cathode compartment of an electrolytic cell provided with a diaphragm until the pH value of the sewage has been increased by from 0.7 to 1.6 pH and adding thereto a chemical coagulating agent of the group consisting of the soluble salts of iron and aluminum in quantity sufficient to produce sedimentation of solids.

2. Process of treating sewage, having a pH value of about 7, which comprises subjecting the sewage to electrodialysis in contact with another conductive liquid through a diaphragm, the electrodialysis being limited to an extent insufficient for the complete flocculation of the sewage solids, completing the flocculation of the sewage solids by the addition of a coagulating agent of the group consisting of the soluble salts of iron and aluminum, and removing the flocculated solids, the electrodialysis being sufficient to raise the pH value of the sewage by from 0.7 to 1.6 and thereby materially to reduce the amount of coagulating agent required for the flocculation of the solids content of the sewage.

3. Process as defined in claim 2 in which the coagulating agent is added to the sewage during the electrodialysis.

4. Process of facilitating the separation of sewage solids from liquids which comprises subjecting a sewage-carrying liquid to electrodialysis in the cathode chamber of an electrolytic cell in contact with another conductive liquid in the anode chamber of the electrolytic cell through a diaphragm until the sewage-carrying liquid has acquired a pH value of approximately 8.1.

5. Method of treating sewage which comprises subjecting sewage in the cathode chamber and sewage sludge in the anode chamber of an electrolytic cell to electrodialysis until the pH value of the sewage has been raised about 0.7 to 1.6 pH and the pH of the sludge has been lowered to between about 3.2 and about 3.6.

6. Method of preparing sewage sludge for mechanical dewatering which comprises subjecting it to electrodialysis in the anode chamber of an electrolytic cell until its pH value has been reduced to about 3.4.

7. Method of preparing sewage sludge for mechanical dewatering which comprises subjecting it to electrodialysis in the anode chamber of an electrolytic cell until its pH value has been reduced to about 3.4 and subjecting the so-treated sludge to filtration to a residual water content of not more than 65%.

8. Method of disposing of sewage which comprises subjecting a given quantity of sewage to electrodialysis in the cathode chamber of an electrolytic cell until its pH value has been increased by from 0.7 to 1.6 against a corresponding amount of sludge in the anode chamber until its pH value is reduced to about 3.4.

9. Process for the treatment of sewage sludge which comprises subjecting the sludge to electrodialysis in the anode compartment of an electrolytic cell in the presence of an insoluble anode against a conductive liquid in the cathode compartment which is maintained at a pH value greater than 7, the sludge and said conductive liquid being separated by a diaphragm, continuing the treatment until the sludge has a pH value of from about 3.0 to about 3.9, and mechanically dewatering the so-treated sludge.

10. Process of treating sewage and sewage sludge which comprises subjecting the sewage and the sewage sludge to electrodialysis in contact with each other through a diaphragm in an electrolytic cell, the sewage occupying the cathode chamber and the sewage sludge the anode chamber of the electrolytic cell, removing sewage from the cathode chamber and separating the solids content thereof to the production of more sludge, delivering the resulting sludge to the anode chamber, and supplying sewage to the cathode chamber to take the place of that removed.

EDGAR A. SLAGLE.